(12) United States Patent
Neel et al.

(10) Patent No.: US 10,440,050 B1
(45) Date of Patent: Oct. 8, 2019

(54) IDENTIFYING SENSITIVE DATA ON COMPUTER NETWORKS

(71) Applicant: United Services Automobile Association (USAA), San Antonio, TX (US)

(72) Inventors: Robert Jason Neel, Boerne, TX (US); Jordan Matthew Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 157 days.

(21) Appl. No.: 15/418,295

(22) Filed: Jan. 27, 2017

Related U.S. Application Data

(60) Provisional application No. 62/287,553, filed on Jan. 27, 2016.

(51) Int. Cl.
*H04L 29/06* (2006.01)
*G06F 21/50* (2013.01)
(Continued)

(52) U.S. Cl.
CPC ........ *H04L 63/145* (2013.01); *G06F 11/3688* (2013.01); *G06F 21/50* (2013.01); *G06F 21/552* (2013.01); *H04L 63/1425* (2013.01)

(58) Field of Classification Search
CPC ... H04L 63/145; H04L 63/1425; H04L 29/06; H04L 12/14; G06F 11/3688; G06F 11/00; G06F 21/50; G06F 21/55; G06F 21/60; G06F 21/552; G07F 17/30; G07F 17/30864; G07F 17/30029; G07F 17/30424; G07F 17/30477; G07F 17/30657; G07F 17/30964
(Continued)

(56) References Cited

U.S. PATENT DOCUMENTS 8,321,940 B1 * 11/2012 Pereira .................... G06F 21/00
726/23
8,407,766 B1 * 3/2013 Newstadt .............. H04L 63/102
726/4

(Continued)

OTHER PUBLICATIONS

"Dump Monitor", Jordan Wright (https://twitter.com/dumpmon, May 28, 2013, hereinafter Wright) (Year: 2013).*
(Continued)

*Primary Examiner* — Farid Homayounmehr
*Assistant Examiner* — Raied A Salman
(74) *Attorney, Agent, or Firm* — Fish & Richardson P.C.

(57) ABSTRACT

A computer-implemented method can be performed to identify the publication of sensitive data and/or malware to a third-party site. According to the method, at least one processor retrieves data items stored on a computer system over a network, the computer system hosting a third-party site, to which the data items are published. The at least one processor stores the data items in local, computer-readable memory, and processes the data items stored in the local, computer-readable memory based on at least one search criteria. The at least one processor determines that at least one of the data items satisfies the at least one search criteria, and in response, provides an alert identifying the at least one data items.

30 Claims, 7 Drawing Sheets

(51) Int. Cl.
  *G06F 21/55* (2013.01)
  *G06F 11/36* (2006.01)
(58) Field of Classification Search
  USPC .......................... 726/22–25, 1, 28; 707/707
  See application file for complete search history.

(56) References Cited

U.S. PATENT DOCUMENTS

| | | | |
|---|---|---|---|
| 8,862,567 B2* | 10/2014 | Aaron .................... | H04L 63/00 |
| | | | 707/707 |
| 9,900,324 B1* | 2/2018 | Barua .................... | H04L 63/14 |
| 2015/0120767 A1* | 4/2015 | Skeen .................. | G06F 16/335 |
| | | | 707/754 |
| 2016/0285928 A1* | 9/2016 | Sanso .................. | H04L 65/403 |

OTHER PUBLICATIONS

Jordan Wright, "Dump Monitor", May 28, 2013, (https://twitter.com/dumpmon, May 28, 2013).*
Ashwin Kumar TK, et al., Identifying Sensitive Data Items within Hadoop, Aug. 24-26, 2015, 2015 IEEE 17th International Conference on High Performance Computing and Communications, International Symposium on Cyberspace Safety and Security, and International Conference on Embedded Software and Systems, pp. 1308-1313.*

* cited by examiner

12/14/2015

Paste Archiver Alerts

/pasteArchiver/alerts.php?showType=cards

Regex Used / Source Sites / Backend Code / Json / Contact Owner / Search All Paste / ClearDisplayFilter
Note: The following are hidden by default (click one to show): exe, EmailAddr, cards, or here to show all

| source | pasteID | dateTime | title | author | matchName | matchedon | ct | md5sum | cuckooID |
|---|---|---|---|---|---|---|---|---|---|
| pastebin.com | Y▒ | 2015-12-14 03:40:58 | untitled | | cards (show/hide) | CHECK ▒ | 2 | N/A | N/A |
| pastebin.com | m▒ | 2015-12-10 04:39:10 | untitled | | cards (show/hide) | ▒ | 1 | N/A | N/A |
| pastebin.com | I▒ | 2015-12-10 01:38:37 | untitled | | cards (show/hide) | 449, ▒ [1 | 3 | N/A | N/A |
| pastebin.com | L▒ | 2015-12-04 22:58:11 | VVC's | | cards (show/hide) | 3839 ▒ | 3 | N/A | N/A |
| pastebin.com | 8▒ | 2015-12-04 26:49:30 | transactions | | cards (show/hide) | alis"▒ "paym | 1 | N/A | N/A |
| pastebin.com | V▒ | 2015-12-03 02:36:18 | PAYPAL ACCOUNTS 2016 | | cards (show/hide) | ercard ▒ | 1 | N/A | N/A |
| pastebin.com | C▒ | 2015-12-03 02:28:17 | ACCOUNTS 2016 | | cards (show/hide) | ercard ▒ | 1 | N/A | N/A |
| pastebin.com | h▒ | 2015-12-03 02:16:17 | VISA HACKED | | cards (show/hide) | ercard ▒ | 1 | N/A | N/A |
| pastebin.com | 7▒ | 2015-12-03 01:56:17 | PAYPAL ACCOUNTS 2016 | | cards (show/hide) | ercard ▒ | 1 | N/A | N/A |
| pastebin.com | T▒ | 2015-11-27 11:38:25 | Untitled | | cards (show/hide) | STER ▒ | 10 | N/A | N/A |
| codepaste.net | 5▒ | 2015-11-27 11:08:15 | sell high quality CVV, Dumps, t / | | cards (show/hide) | STER ▒ | 10 | N/A | N/A |
| codepaste.net | 5▒ | 2015-11- | sell high quality CVV, Dumps, t / | | cards | STER ▒ | 10 | N/A | N/A | http://▒/pasteArchiver/alerts.php?showType=cards  1/10

*FIG. 3A*

IDENTIFYING SENSITIVE DATA ON COMPUTER NETWORKS

CROSS-REFERENCE TO RELATED APPLICATIONS

This application claims priority from U.S. Provisional Application Ser. No. 62/287,553, filed on Jan. 27, 2016, which is incorporated herein by reference in its entirety.

BACKGROUND

Enterprises generate and maintain sensitive data. As an example, enterprises generate and maintain data regarding its users' personal information and/or accounts (e.g., personally identifiable information, contact information, login credentials, account information, and so forth). In some cases, unauthorized third-parties (e.g., hackers) infiltrate enterprise systems to access and steal user information. As this data can be used for malicious purposes by unauthorized third-parties, it is important to protect this data from theft. In some instances, such theft may occur despite security measures.

In some cases, sensitive data can be shared by unauthorized third-parties over a publically accessible computer system (e.g., a publically accessible website). As an example, sensitive data is often shared on "paste" sites (also called "pastebins") or online forum sites that allow users to anonymously store and publish data on the Internet. When sensitive information is publically distributed in this manner, enterprises and/or users may be unaware of the publication of the sensitive information.

SUMMARY

Implementations of the present disclosure are generally directed to determining when sensitive information has been published to a network (e.g., the Internet), and alerting any affected users.

In general, in an aspect, a computer-implemented method can be performed to identify the publication of sensitive data and/or malware to a third-party site. According to the method, at least one processor retrieves data items stored on a computer system over a network, the computer system hosting a third-party site, to which the data items are published. The at least one processor stores the data items in local, computer-readable memory, and processes the data items stored in the local, computer-readable memory based on at least one search criteria. The at least one processor determines that at least one of the data items satisfies the at least one search criteria, and in response, provides an alert identifying the at least one data items.

Implementations of this aspect can include one or more of the following features.

In some implementations, the third-party site can be a paste site, and the data items can be paste items published on the paste site.

In some implementations, one or more of the search criteria can correspond to personally identifiable information, contact information, login credentials, and/or account information associated with one or more users and/or enterprises.

In some implementations, one or more of the search criteria can correspond to e-mail addresses, mailing addresses, telephone numbers, account numbers, and/or passwords associated with one or more users and/or enterprises.

In some implementations, one or more of the search criteria can correspond to malicious software or computer code.

In some implementations, the search criteria can include one or more regular expressions.

In some implementations, the method can further include monitoring, by the at least one processor, the computing system for newly published data items. The method can further include determining, by the at least one processor, that a data item has been published by the computing system, and in response, retrieving the published data item.

In some implementations, providing the alert identifying the at least one data items can include: identifying one or more users and/or enterprises associated with information contained within the at least one data items, and transmitting the alert to one or more devices associated with the one or more users and/or enterprises. Identifying one or more users and/or enterprises associated with information contained within the at least one data items can include: obtaining a database including information pertaining to the one or more users and/or enterprises, determining that the information contained within the at least one data item corresponds to information pertaining to a particular user or enterprise, and in response, transmitting the alert to a device associated with that user or enterprise.

In general, in another aspect, a computer-implemented method can be performed to identify publication of malicious software or code. At least one processor retrieves data items stored on a computer system over a network, the computer system hosting a third-party site, to which the data items are published. The at least one processor determines that at least one of the data items includes encoded executable data, and in response, decodes the encoded executable data. The at least one processor analyzes the decoded executable data in a sandboxed software testing environment.

Implementations of this aspect can include one or more of the following features.

In some implementations, analyzing the decoded executable data in the sandboxed software testing environment can include executing the encoded executable data in the sandboxed software testing environment.

In some implementations, analyzing the decoded executable data in the sandboxed software testing environment can further include identifying an effect of executing the encoded executable data. The effect can include deleting or revising particular data within the sandboxed software testing environment, and/or attempting to contact a particular third-party computer system.

In some implementations, the method can further include providing an alert identifying the effect.

In some implementations, the encoded executable data can be encoded in base64.

In some implementations, the third-party site can be a paste site, and the data items can be paste items published on the paste site.

In some implementations, the method can further include processing, by the at least one processor, data items stored in the local, computer-readable memory based on at least one search criteria. One or more of the search criteria can correspond to malicious software or computer code.

In some implementations, the method can further include monitoring, by the at least one processor, the computing system for newly published data items. The method can further include determining, by the at least one processor, that a data item has been published by the computing system, and in response, retrieving the published data item.

One or more of the implementations described herein can provide various benefits. For example, one or more implementations can allow users to identify sensitive information that has been publically distributed by a third-party computer system over a computer network (e.g., the Internet), and take an appropriate action in response. This is beneficial, for example, as it facilitates timely action to reduce the negative effects of the comprised data. Further, implementations allow a user to identify sensitive information in a manner that masks the user's identity from the owners or operators of the third-party computer system. Thus, data can be analyzed in a manner that reduces the likelihood of adverse action by the owner or operator of the third-party computer system.

The details of one or more implementations are set forth in the accompanying drawings and the description below. Other features and advantages will be apparent from the description and drawings, and from the claims.

DESCRIPTION OF DRAWINGS

FIGS. 3A-3C depict example interfaces in accordance with implementations of the present disclosure.

DETAILED DESCRIPTION

Figure 1:
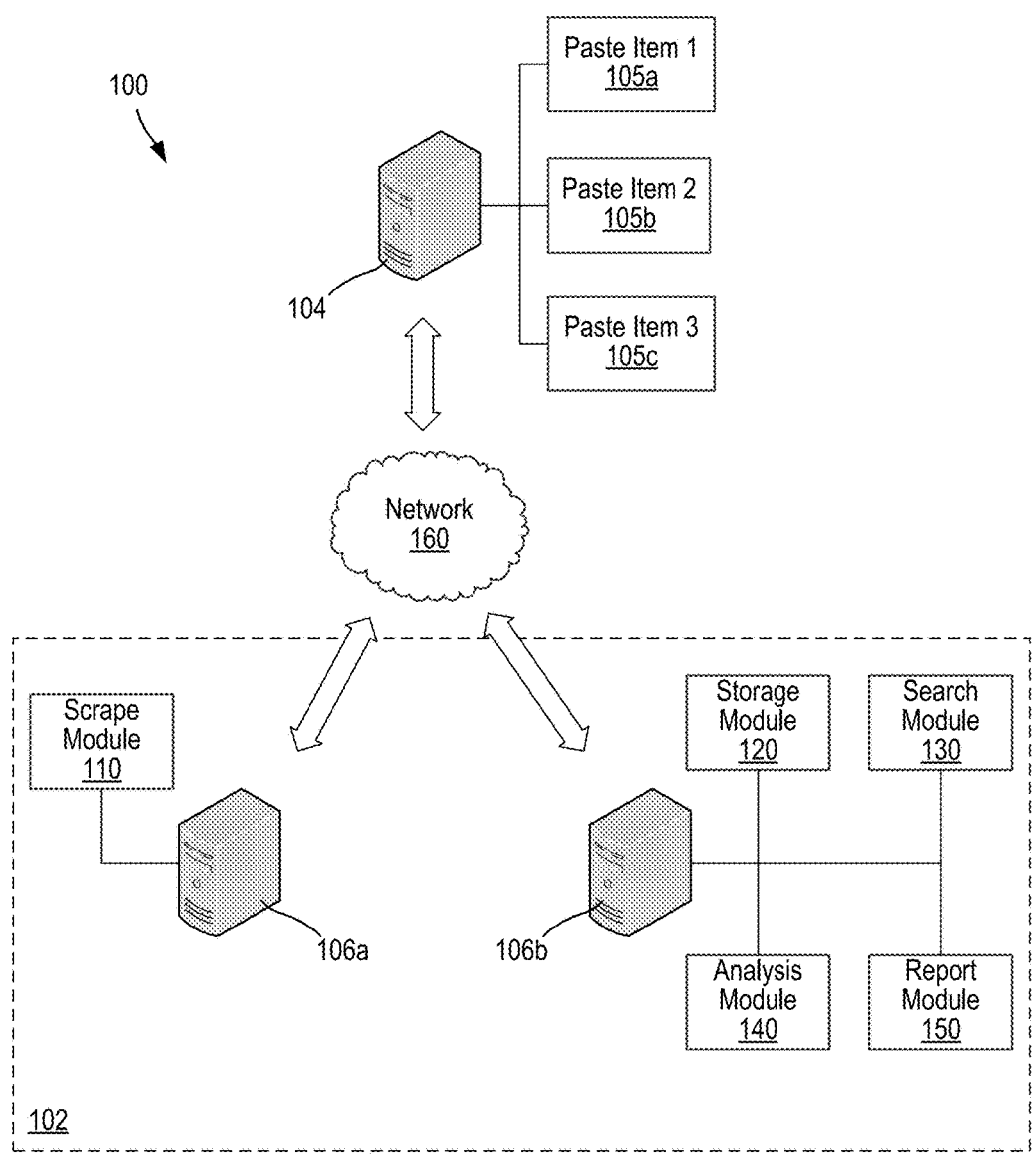
FIG. 1 depicts an example architecture that can be used to execute implementations of the present disclosure.

Implementations of the present disclosure are generally directed to determining when sensitive information has been published to a network (e.g., the Internet), and alerting any affected users. In some implementations, publication of sensitive data can be identified using a detection system communicatively connected to a publically accessible computer network, such as the Internet. Users can use the detection system to monitor the dissemination of sensitive data on the network, and take appropriate action to mitigate the risks of the compromised data (i.e., published sensitive data). Users can also use the detection system to monitor the dissemination of malicious software or computer code ("malware") on the network, and take appropriate action to reduce the negative impact of the malware.

In some implementations, the detection system can identify sensitive information obtained from an enterprise. Example enterprises can include, but are not limited to, enterprises providing computer-implemented services (e.g., e-mail providers), financial institutions, and healthcare providers. Sensitive information can include, for example, personally identifiable information (e.g., names, social security numbers, passport numbers, driver's license numbers, and so forth), contact information (e.g., mailing addresses, telephone numbers, e-mail addresses, and so forth), login credentials (e.g., user names, passwords, personal identification numbers (PINs), security questions and answers, and so forth), account information (e.g., account numbers, account balances, and so forth), patient information (e.g., medically-related information), and computer system information (e.g., IP addresses or other network addresses of computers associated with the enterprise). In some cases, sensitive information can pertain to one or more customers of the enterprise (e.g., a customer's personally identifiable information, contact information, login credentials, account information, etc.). In some cases, sensitive information can pertain to the one or more employees of the enterprise (e.g., an employee's personally identifiable information, contact information, login credentials, etc.). In some cases, sensitive information can pertain to the management of one or more computer systems associated with the enterprise (e.g., network addresses of one or more server computer systems, such as backend systems related to money movement, bank processes, software package management, etc., and login credentials used to access and/or modify the operation those computer systems).

In response to determining that sensitive information has been published, the detection system can notify any affected users that potentially sensitive information has been publically disseminated, and prompt the users to take appropriate action (e.g., prevent or limit access to compromised accounts, replace login credentials for compromised accounts, open new or replacement accounts with non-compromised account information, and/or monitor account activity for unauthorized activity).

In some implementations, the detection system can identify malicious software or computer code. Malicious software or computer code can include, for example, malware such as viruses, Trojan horses, rootkits, backdoors, and evasion software that can comprise users' computers and/or data. In some examples, an enterprise operating the detection system can use information gathered about the malicious software for enhancing its own security measures. In some examples, the detection system can notify users that malicious software or computer code has been publically disseminated, and prompt the users to take appropriate action (e.g., analyze the malicious software or computer code to determine its effect and develop countermeasures).

To provide further context for implementations of the present disclosure, sensitive information (e.g., illicitly obtained) and/or malware can be published to one or more third-party sites (e.g., web sites, FTP sites), from which users can retrieve the sensitive information and/or malware. For example, a malicious user (e.g., a hacker) can illicitly obtain sensitive information from a computer network of an enterprise (e.g., hack into the computer network), and can post the sensitive information to a third-party site, from which other users can copy the sensitive information. As another example, a malicious user (e.g., a hacker) can develop malware, and can post the malware to a third-party site, from which other users can copy the malware. In some examples, the sensitive information is posted as text, images, video, audio, and other file types. In some examples, malware is encoded as text, and is posted as text (e.g., as opposed to an executable binary file).

Implementations of the present disclosure address several technical hurdles in identifying sensitive data and/or malware distributed across computer networks. In some examples, sensitive information and/or malware is made available to the public for a relatively short duration of time. For example, sensitive data can be posted to a third-party site and can expire (e.g., be automatically deleted from the third-party site) after a threshold period of time has elapsed (e.g., 5 minutes, 10 minutes, 1 hour, 4 hours, 24 hours, or some other period of time after posting). Consequently, if the distribution of the sensitive data is not detected within the threshold period of time, the fact that the sensitive information was available on the third-party site might not otherwise be known. Implementations of the present disclosure can be used to detect the distribution of sensitive data and/or malware, even after the sensitive data and/or malware is later removed.

As another example, third-party sites provide search functionality that enables users to search through posted sensitive information and/or malware. In some examples, the search functionality is limited (e.g., only rudimentary searches can be performed). Consequently, if an enterprise visits a third-party site to perform a search in an effort to determine whether sensitive information from the enterprise has been posted to the third-party site, the limited search functionality may result in a false-negative (e.g., the search(es) showing no results, when sensitive information actually had been posted to the third-party site). Implementations of the present disclosure provide improved search capabilities (e.g., by providing a user with a greater number of search options, more flexible or more power search options, etc.) Thus, implementations of the present disclosure can detect sensitive information and/or malware more accurately.

Further, to search a third-party site for sensitive information, a search query is submitted to the third-party site. The search query itself, however, can leak information. For example, if an enterprise is searching for sensitive information based on a format of user identifiers used by the enterprise, a search query submitted to the third-party site could reveal the format of user identifiers used by the enterprise. As another example, if an enterprise submits a search query containing a specific string of sensitive information, the string of sensitive information would be revealed to the third-party site. Implementations of the present disclosure enable searches to be conducted privately, and without leaking potentially sensitive information to a third-party. Thus, implementations of the present disclosure enable searches to be conducted more securely.

As another example, and as noted above, malware can be encoded into text format and can be posted to a third-party site. In some examples, it can be difficult to determine that a particular text block is actually text-encoded malware. Implementations of the present disclosure can be used to more accurately detect malware encoded in this manner.

As another example, sensitive data and/or malware can be posted on hundreds (or thousands) of sites, and can intermittently appear/disappear from sites. Due to the vast and dynamic manner in which information is published, there are significant challenges to accurately determining whether sensitive data and/or malware has been posted to the sites. Implementations of the present disclosure can be used to detect sensitive data and/or malware across this dynamic environment.

As described in further detail herein, the above-described, example technical hurdles, as well as other technical hurdles not explicitly described above, are addressed by implementations of the present disclosure.

FIG. 1 depicts an example architecture 100 that can be used to execute implementations of the present disclosure. In the depicted example, the architecture 100 includes a detection and reporting system 102, and a third-party computing system 104. Although a single third-party computing system 104 is depicted, it is appreciated that implementations of the present disclosure can include multiple third-party computing systems 104. In the depicted example, the detection and reporting system 102 includes multiple computing systems 106a and 106b. It is contemplated, however, that the detection reporting system 102 can include fewer or more computing systems than depicted in FIG. 1.

The computing system 106a provides a scrape module 110. In some examples, the scrape module 110 is provided as one or more computer-executable programs executed by the computing system 106a. The computing system 106b provides a storage module 120, a search module 130, an analysis module 140, and a report module 150. In some examples, the storage module 120, the search module 130, the analysis module 140, and the report module 150 are each provided as one or more computer-executable programs executed by the computing system 106b. Although multiple modules are provided and are distributed across multiple computing systems 106a and 106b in FIG. 1, it is contemplated that the multiple modules can be executed by a single computing system, and/or a single module can be provided to collectively perform the described functions.

In some examples, the computing system 104 includes at least one server device, and at least one data store. In the example of FIG. 1, the computing system 104 is intended to represent various forms of servers including, but not limited to a web server, an application server, a proxy server, a network server, and/or a server pool. In some examples, and as described in further detail herein, the computing system 104 hosts one or more third-party sites (e.g., paste sites, file sharing sites), through which sensitive data and/or malware can be posted.

In some examples, the computing systems 106a and 106b can be any appropriate electronic device that is used by a user to view, process, transmit and receive data. Examples computing systems include computers (such as desktop computers, notebook computers, server systems, etc.), mobile computing devices (such as cellular phones, smartphones, tablets, personal data assistants, notebook computers with networking capability), and other computing devices capable of transmitting and receiving data from network 160. The computing systems 106a and 106b can include devices that operate using one or more operating systems (e.g., Microsoft Windows, Apple OSX, Linux, Unix, Android, iOS, etc.) and/or architectures (e.g., x86, PowerPC, ARM, etc.) In some implementations, one or more computing systems 106a and 106b need not be located locally with respect to the rest of the detection and reporting system 102. For example, one or more of the computing systems 106a and 106b can be located in one or more remote physical locations.

In the depicted example, the computing systems 106a and 106b are each illustrated as a single component, but one or both can be implemented on one or more computing devices. One or more of the computing systems 106a and 106b can be, for example, a single computing device that is connected to the network 160, and one or more of the modules 110, 120, 130, 140, and 150 can be maintained and operated on the single computing device. In some implementations, one or more of the computing systems 106a and 106b can include multiple computing devices that are connected to the network 160, and one or more of the modules 110, 120, 130, 140, and 150 can be maintained and operated on some or all of the computing devices. For example, one or more of the computing systems 106a and 106b can include multiple computing devices, and one or more of the modules 110, 120, 130, 140, and 150 can be distributed on one or more of the multiple computing devices.

In some examples, the network 160 can be any communications network through which data can be transferred and shared. For example, the network 160 can be a local area network (LAN) or a wide-area network (WAN), such as the Internet. The network 160 can be implemented using various networking interfaces, for instance wireless networking interfaces (such as Wi-Fi, Bluetooth, or infrared) or wired networking interfaces (such as Ethernet or serial connections). The network 160 can include combinations of more than one network, and can be implemented using one or more networking interfaces.

In accordance with implementations of the present disclosure, the detection and reporting system 102 monitors the dissemination of data on third-party computer systems (e.g., paste sites, file sharing sites, online discussion forums, chat rooms, wikis, and so forth), and creates a local copy of that data. For example, and as depicted in FIG. 1, the detection and reporting system 102 is communicatively coupled to the third-party computing system 104. In this example, the computing system 104 hosts one or more paste sites that allow users (e.g., malicious users) to anonymously store and publish data (e.g., "paste items" 105a-c). Data that is published in this manner is publically accessible to others on the network 160. For example, the computing system 104 can maintain a website that publishes the paste items 105a-c, and users can access the website and the paste items 105a-c using one or more computing devices communicatively coupled to the network 160. In accordance with implementations of the present disclosure, the detection and reporting system 102 periodically monitors one or more third-party sites (e.g., maintained by the computing system 104), retrieves one or more paste items of the site(s), and stores a local copy of each of the paste items 105a-c (e.g., by downloading or transferring the paste items 105a-c from the computing system 104 to the computing system 106a).

In some implementations, the detection and reporting system 102 includes a plurality of automated agents, each automated agent being a computer-executable program (e.g., executed by one or more of the computing systems 106a and 106b). In some examples, an automated agent can include one or more of the modules 110, 120, 130, 140, and 150.

In some implementations, each automated agent is specific to a particular third-party site. For example, third-party sites can differ in how they are accessed, have different layouts, post or present data to users in different ways, alert users to new postings in different ways (or not alert users at all), and/or differ in other ways. Thus, each automated agent can be configured to account for these differences.

As an example, a third-party site might prohibit access to data posted to the site unless a valid user account and credentials are provided. Accordingly, a user account and credentials can be established with the third-party site (e.g., using the site's user registration function), and the automated agent can use the user account and credentials to log into the site.

As another example, a third-party site might include an area highlighting newly posted and/or actively searched/copied data (e.g., a "what's new" page, or a "trending" page). Accordingly, an automated agent can be configured to retrieve data posted to such pages to obtain newly published data.

As another example, a third-party site might not provide a readily discernable means for identifying newly posted data. Consequently, an automated agent can be configured to record states of the third-party site (e.g., by identifying the data that is user-accessible on the third-party site at particular points in time), and can compare a current state of the site with a last recorded state of the site to provide a "delta" (e.g., data identifying differences between the two states). In some examples, the delta indicates newly posted data (e.g., since the previously recorded state). Accordingly, the automated agent can retrieve (e.g., copy) the data indicated by the delta, and can record the current state of the site for subsequent delta determinations.

As an example, an automated agent monitors a third-party site, and determines that three paste items A, B, and C are user-accessible. The automated agent retrieves each of these paste items for storage and processing (e.g., as described herein). Further, the automated agent records the current state of the site by recording that paste items A, B, and C are user-accessible at that point in time.

The automated agent continues to monitor the third-party site. At some point in the future, the automated agent determines that four paste items A, B, C, and D are user-accessible. The automated agent retrieves the new paste item D (i.e., the paste item that was not included in the previous state) for storage and processing. Further, the automated agent records the new state of the site by recording that paste items A, B, C, and D are user-accessible at that point in time.

The automated agent again continues to monitor the third-party site. At some point in the future, the automated agent determines that four paste items A, B, C, and D are user-accessible. The automated agent determines that no new paste items are available, and does not record a new state of the site. In this manner, the automated agent can record new states only when the contents of the site have changed. This can be beneficial, for example, as it can reduce the amount of resources (e.g., network and/or processing resources) needed to maintain a current copy of the site.

Although an example state-based technique is described, this is merely an illustrative example. In practice, other techniques can be used, depending on the implementation. For example, in some implementations, an automated agent can record new states for a site (e.g., continuously, periodically, or according to some other pattern), even if the contents of the site have not changed between states. As another example, in some implementations, a user can manually specify that the automated agent record new states for a site.

In some examples, the detection and reporting system 102 (e.g., through automated agents and/or the scrape module 110) can periodically check the computing system 104 for revisions or updates (e.g., by periodically accessing a website maintained by the computing system 104), and determine whether any new or revised items have been published on the website since the last time it was accessed. In some examples, the detection and reporting system 102 can continuously check the computing system 104 for revisions or updates to the information posted on the website. In some examples, the detection and reporting system 102 can check the computing system 104 for revisions or updates in response to a manually inputted user command.

In some implementations, the scrape module 110 can be used (e.g., by itself, or in conjunction with one or more automated agents) to obtain a copy of the data contained on the computing system 104 and posted to the website, by "scraping" the content of the web site. For example, the computing system 104 can publish data on a website having a known layout (e.g., a template that positions content in a particular portion of the website and in a particular format). The scrape module 110 can obtain a copy of the website, then parse the website based on a set of parsing rules specific to that layout (e.g., using parsing rules based on the template of the website). In some examples, the parsing rules account for the layout of the website, and enable the scrape module 110 to extract information (e.g., the contents of a paste item) from among other portions of the website. In some examples, the scrape module 110 can obtain local copies of data contained from any number of other computing systems (e.g., multiple different paste sites) by processing each website based on respective sets of parsing rules, such that the contents of each paste site are identified and extracted accurately from the computing systems. In other words, a set of parsing rules can be specific to a particular website to enable copying of data from the website.

In some implementations, the storage module 120 records and maintains the data obtained by the scrape module 110. This is beneficial, for example, as it enables the detection and reporting system 102 to retain a local copy of the data published by the computing system 104, even if that data is later revised or deleted from the computing system 104. As an example, the storage module 120 can maintain a database that contains entries for each of the paste items 105a-c obtained by the scrape module 110. Each entry can include, for example, the contents of one of the paste items 105a-c, the time and/or date that the paste item 105a-c was published by the computing system 104, the time and/or date that the paste item 105a-c was retrieved by the scrape module 110, the source of the paste item 105a-c (e.g., the identity (IP address) of the computing system 104 and/or an author of the paste item 105a-c, if known). In some examples, the storage module 120 can also record and maintain additional information generated by each of the other modules 130, 140, and 150, as described in further detail herein.

In some implementations, the search module 130 identifies data stored by the storage module 120 that satisfies one or more search criteria. In some examples, the search module 130 can identify potentially sensitive information contained within the paste items 105a-c based on patterns or strings of text contained within the paste items 105a-c. As an example, the search module 130 can search the paste items 105a-c to locate patterns or strings of text that are indicative of users' account numbers (e.g., by locating a string of characters having a particular length and/or pattern corresponding to the length and/or pattern used by a financial institution when generating account numbers). As another example, the search module 130 can search the paste items 105a-c to locate patterns or strings of text that are indicative of users' e-mail addresses (e.g., by locating a string of characters having a particular pattern corresponding to the format of an e-mail address). In some examples, the search module 130 can search the paste items 105a-c to locate patterns or strings of text that are indicative of other potentially sensitive information, such as personally identifiable information (e.g., names, social security numbers, passport numbers, driver's license numbers, and so forth), contact information (e.g., mailing addresses, telephone numbers, e-mail addresses, and so forth), login credentials (e.g., user names, passwords, personal identification numbers (PINs), security questions and answers, and so forth), account information (e.g., account numbers, account balances, and so forth), and computer systems (e.g., IP addresses or other network address of computers associated with the enterprise). Information regarding the search criteria and the results of the searches can be stored in the storage module 120 for later retrieval.

In some implementations, search criteria can be pre-defined and/or created by a user (e.g., an administrator) of the detection and reporting system 102. For example, the search module 130 can be pre-loaded with search criteria for locating particular types of sensitive data, and a user can select one or more of the search criteria to be used for searching. In some examples, the search module 130 can enable a user to add, revise, and/or modify search criteria, such that the detection and reporting system 102 can be customized to identify different types of information and/or to refine the searches. In some examples, the search criteria can be defined as strings of text (e.g., search strings). In some examples, the search criteria can be defined as regular expressions (e.g., "regex" or "regexp").

In some implementations, the search module 130 can search the paste items 105a-c stored in the storage module 120, and identify paste items based on the number of individual instances in which its contents have a particular pattern or string (e.g., the number of search "hits" within a paste item). For example, the search module 130 can search the paste items 105a-c to locate patterns or strings of text that are indicative of users' e-mail addresses. In some examples, the search module 130 can determine that the paste item satisfies the search criteria only when the paste item contains a particular number of such patterns or strings (e.g., five, ten, fifteen, twenty). This can be useful, for example, as a paste item containing a large number of e-mail address could be indicative of a collection of user login credentials (e.g., a "password dump" of e-mail address and password pairs), while a paste item contain a small number of e-mail addresses might be a false positive.

In some implementations, the search module 130 can locate patterns or strings of text that are indicative of malware. For example, executable software (e.g., an executable binary file) can be encoded in plain text (e.g., encoded in base64), then published on a paste site for distribution. The search module 130 can locate patterns or strings of text that are indicative of encoded executable software, such as a particular header that is commonly found in encoded executable binary files. This can be helpful, for example, as it enables the detection and reporting system 102 to recognize executable (and potentially malicious) software or computer code, even when the software or computer code is published without a description.

In some implementations, potentially malicious software or computer code identified by the search module 130 can be transferred to the analysis module 140 for processing. For example, and as noted above, malware can be encoded as text (e.g., by transforming the malware from binary to text (base64)). In some examples, the analysis module 140 can decode the malware (e.g., by transforming the malware from base64 to computer-executable binary), and can execute the malware in a protected software environment (e.g., a "sandboxed" virtual machine). The analysis module 140 can identify the effects of the malware in the protected software environment, and determine whether it is indeed malicious. For example, if the malware deletes or revises particular data within the virtual machine, it may be considered malicious. As another example, if the malware attempts to contact another computer system (e.g., an unknown computer system or a computer system known to be a control system for a malicious computer network), it may be considered malicious. As another example, if the malware attempts to access certain types of information (e.g., sensitive user information), it may be considered malicious. In some examples, the analysis module 140 can be implemented using third-party software modules. As an example, the analysis module 140 can be implemented using a software package such as Cuckoo Sandbox. Information regarding the analyses of malware can be stored in the storage module 120 for later retrieval.

In some implementations, the detection and reporting system 102 can automatically analyze potential malware. For example, the search module 130 can search one or more copied paste items to locate patterns or strings of text that are indicative of an executable binary file. The search module 130 can automatically transfer any matching paste items to the analysis module 140 for decoding and/or analysis. The results of the analysis can be automatically stored by the storage module 120. This enables the detection and reporting system 102 to quickly and efficiently identify potential malware, without requiring that a user (e.g., an administrator) manually intervene during the process.

In some implementations, the report module 150 presents information regarding the findings of the detection and reporting system 102 to one or more users. For example, the report module 150 can present the copied paste items 105a-c in a user interface that allows a user (e.g., an administrator) to selectively access and view each of the paste items 105a-c. In some examples, the report module 150 can present a subset of the copied paste items 105a-c in a user interface, such as a subset of the copied paste items that match particular search criteria. This enables the user to quickly review paste items matching particular search criteria, and confirm whether those paste items contain sensitive information. Information generated by the report module 150 can be stored in the storage module 120 for later retrieval.

In some examples, the report module 150 can present information in the form of a summary report. For example, the report module 150 can generate one or more tables or charts that summarize the paste items, the results of the searches conducted by the search module 130, and/or the results of analyses conducted by the analysis module 140.

In some examples, the report module 150 can generate alerts to one or more users in response to the results of the searches conducted by the search module 130, and/or the results of analyses conducted by the analysis module 140. For example, if the search module 130 identifies a paste item containing potentially sensitive information, the report module 150 can generate an alert to a user indicating that sensitive information may have been distributed by a third-party computer system. In some examples, the user can be a user that is affected by the distribution (e.g., the user whose sensitive information was distributed on the paste site). In some examples, the alert can be in the form of an e-mail message, a text message, a phone call, a voicemail, a chat message, a fax, or some other message, and transmitted to an appropriate communications device associated with the user. In some examples, the alerts can be sent to one or more customers of a financial institution and/or one or more employees of a financial institution (e.g., a customer service representative, a fraud detection specialist, an administrator, or other employee).

The detection and reporting system 102 can identify users who are affected (or potentially affected) by a distribution of sensitive information in various ways.

In some implementations, an enterprise can maintain one or more databases containing information regarding its users. These databases can include, for example, collections of personally identifiable information, contact information, login credentials, account information, patient information, and/or computer system information regarding each user. These databases can be stored by the computing system 106b (e.g., by the storage module 120) or another computing system. As described herein, the detection and reporting system 102 can retrieve data items distributed by a third-party system (e.g., via scrape module 120), and identity potentially sensitive information contained within these data items (e.g., via the search module 130). One or more items of potentially sensitive information can be cross-referenced against the contents of the databases to identify users who may be affected. In turn, those identified users can be notified using the contact information contained within the database. In some implementations, if no affected users are identified, the detection and reporting system 102, no alerts are sent.

As an illustrative example, a paste site publishes a paste item containing the e-mail addresses and passwords of several customers of a financial institution. The detection and reporting system 102 monitors the paste site for the publication of new paste items, retrieves the published paste item, and determines that the paste item contains several items of potentially sensitive information (in this case, e-mail addresses and passwords). The e-mail addresses and/or passwords are cross-referenced against a database containing information regarding the financial institution's users (e.g., a database containing users' identifies, e-mail addresses, mailing addresses, telephone numbers, account information, passwords, and other such information). Based on this comparison, the detection and reporting system 102 identifies several users having the same e-mail address and/or passwords as those found in the paste item. Based on this match, the detection and reporting system 102 generates alerts to identified users (e.g., by sending e-mails to e-mail addressed associated with those users, making a telephone call to telephone numbers associated with those users, sending physical mail to mailing addresses associated with those users, and so forth). In some implementations, a user can be directly contacted based on contact information contained within the potentially sensitive information itself. As an illustrative example, a paste site publishes a paste item containing credit card numbers and mailing addresses of several users. The detection and reporting system 102 monitors the paste site for the publication of new paste items, retrieves the published paste item, and determines that the paste item contains several items of potentially sensitive information (in this case, credit card numbers and mailing addresses). The detection and reporting system 102 generates an alert by sending physical mail to each of the mailing addresses contained in the paste item. This can be beneficial, for example, as it enables the detection and reporting system 102 to alert potentially affect users, even if the detection and reporting system 102 does not otherwise have any information regarding those users.

In some implementations, the report module 150 can automatically perform particular tasks. For example, the report module 150 can automatically create a report in an issue tracking system. The report can, for example, identify a potential issue, and include information to a user for potential actions that can be taken to resolve the issue. As an example, in the case of a financial institution, the report module 150 can generate a report identifying the paste site containing sensitive information, and suggesting that a user prevent or limit access to compromised accounts, replace login credentials for compromised accounts, open new or replacement accounts with non-compromised account information, and/or monitor account activity for unauthorized activity. In some examples, the report module 150 can transmit a command to perform these suggested actions automatically, without user intervention.

Figure 2A:
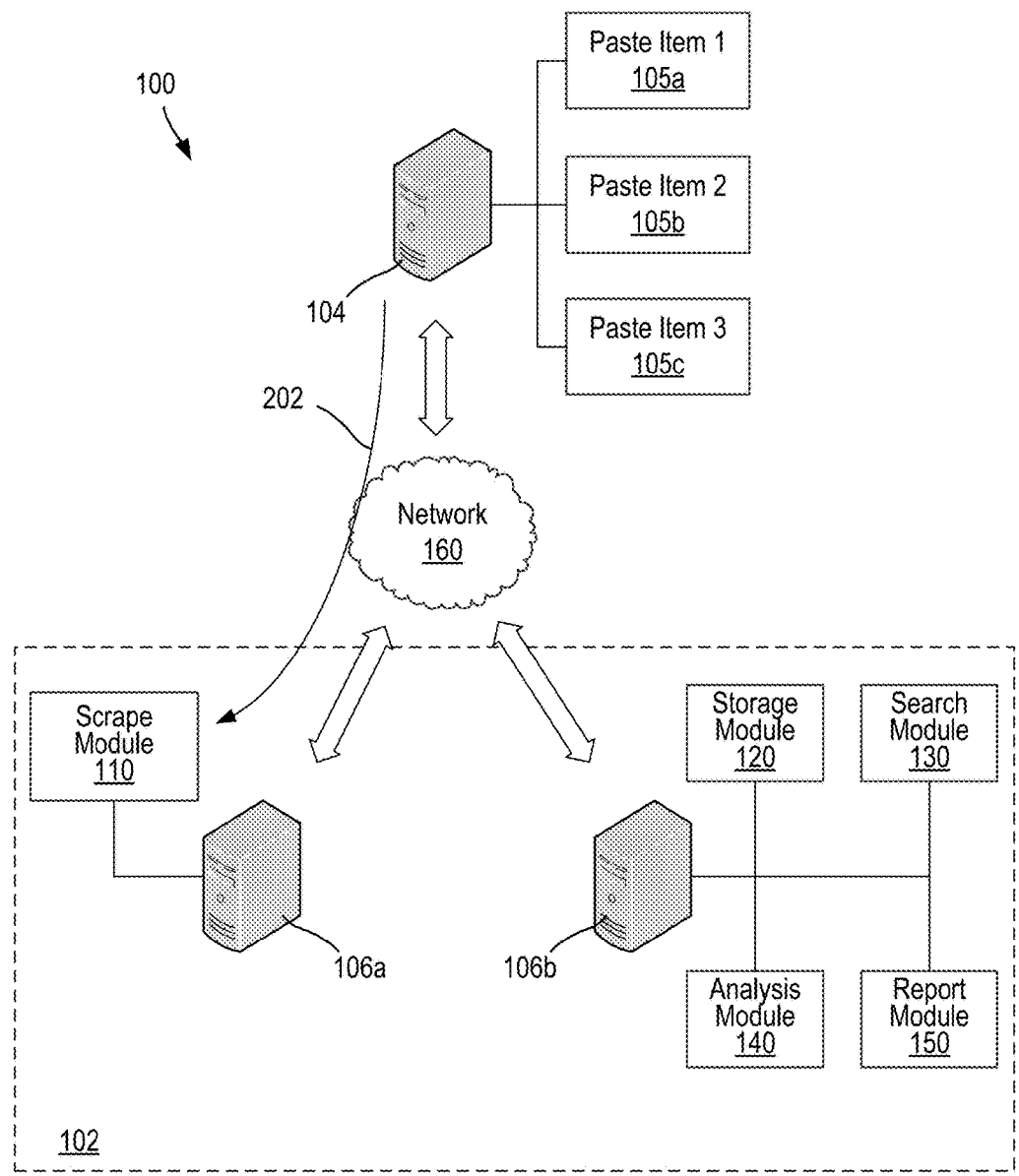
FIGS. 2A and 2B depict an example use case in accordance with implementations of the present disclosure.
Figure 2B:
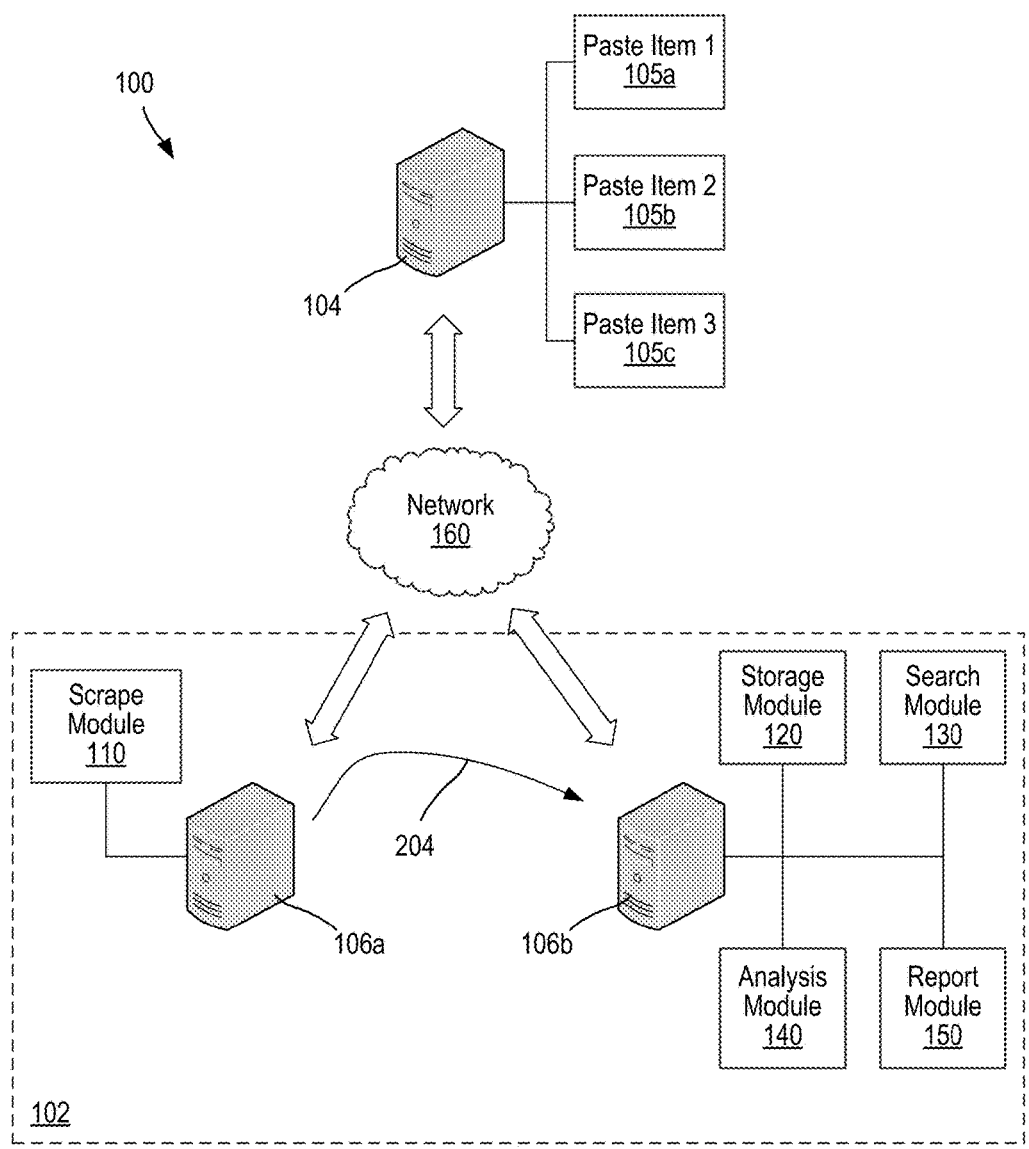

FIGS. 2A and 2B depict an example use case in accordance with implementations of the present disclosure.

As shown in FIG. 2A, the scrape module 110 is maintained on the computing system 106a, and several paste items 105a-c are stored on the computing system 104. The computing systems 106a and 104 are communicatively coupled by the network 160, which enables the transfer of data between them. The scrape module 110 monitors the computing system 104 for paste items, and upon identifying new and/or revised paste items, obtains copies of each of the paste items (e.g., the paste items 105a-c). This can be performed, for example, by downloading or transferring the paste items 105a-c from the computing system 104 to the computing system 106a, indicated by arrow 202.

As shown in FIG. 2B, the scrape module 110 transfers the copied paste items 105a-c to the computing system 106b (indicated by arrow 204), and the copied paste items are stored by the storage module 120. As described herein, the search module 130 can search each of the copied paste items to determine whether any match particular search criteria, and the analysis module 140 can process the copied paste items to determine whether any contain malicious software or computer code. As described herein, report module 150 can generate one or more reports and/or alerts to present the results of the search and analysis to a user.

As shown in FIGS. 2A and 2B, the scrape module 110 and the other modules 120, 130, 140, and 150 are maintained on separate computing systems 106a and 106b. This has the effect of segregating the data download process (e.g., the obtaining of data from the third-party computing system 104) from the data analysis process (e.g., the processing or data by the modules 120, 130, 140, and 150). This can be beneficial, for example, as it enables a user to mask the owner or operator of the detection and reporting system 102 from the computing system 104. For example, the computing system 106a cannot be readily attributed to the owner or operator of the detection and reporting system 102 (e.g., a computer system having a location and/or access point that cannot be attributed to the owner or operator of the detection and reporting system 102). Thus, to the computing system 104, the paste items 105a-c appear to be accessed by a general user of the network 160. However, data obtained by the computing system 106a can be transmitted to the separate computing system 106b for processing (having an identity that might otherwise be attributable to the owner or operator of the detecting and reporting system 102). Thus, data can be analyzed in a manner that reduces the likelihood of adverse action by the owner or operator of the computing system 104. Further, as only the computing system 106a is exposed to the computing system 104, the owner or operator of the detection and reporting system 102 can periodically replace or relocate the computing system 106a to further mask their identity, without having to replace or relocate the computing system 106b.

Further, in some cases, the owner or operator of the detection and reporting system 102 can utilize additional computing systems, each having a scrape module 110, and each configured to access some or all of the paste items 105a-c. This can be useful, for example, to provide a degree of redundancy to the data retrieval process (e.g., by duplicatively retrieving data using multiple different computing systems), and/or to further mask the activities of the owner or operation of the detection and reporting system 102 (e.g., by distributing the data retrieval process across multiple computing systems, so as to not arose suspicion). Nevertheless, in some cases, the scrape module 110 and the other modules 120, 130, 140, and 150 can be maintained on the same computing system.

Further, as the computing system 106b maintains a local copy of each of the paste items 105a-c, this enables the owner or operator of the detection and reporting system 102 to analyze the contents of the paste items 105a-c without exposing their activities to the computing system 104. For example, although the computing system 104 could include a search feature for searching through the paste items 105a-c, the computing system 104 might maintain a log of searches performed using this tool. This could be undesirable, as it could inform the owner or operator of the computing system 104 of intentions, and result in an adverse action (e.g., blocking access to the owner or operator of the computing system 104, manipulating the search results, etc.). Thus, the detection and reporting system 102 can be used instead, such that the data analysis is isolated from the computing system 104. Further, as the computing system 106b maintains a local copy of each of the paste items 105a-c, this enables the owner or operator of the detection and reporting system 102 to analyze the contents of the paste items 105a-c, even if those paste items 105a-c are later revised or deleted from the computing system 104. This enables the owner or operator of the detection and reporting system 102 to conduct a historical analysis of the paste items 105a-c, despite attempts to hide the paste items after they have been published.

As described above, the report module 150 can generate one or more reports and/or alerts to a user. An example report interface 300 is shown in FIG. 3A. In this example, sensitive information has been obscured. However, in practice, sensitive information can be clearly displayed to the user for examination. The report interface 300 is arranged in a table format, with each row corresponding to a different paste item. Each column corresponds to different information regarding the paste items. In this example, the report interface 300 presents the source of the paste item, an identifier associated with the paste item (e.g., an identification number of character string), the time that the item was published on the paste site, the title of the paste item, the author of the paste site, and the search criteria that match the paste item, and the number of search "hits" within the paste item. Although example types of information and an example arrangement are shown, this is merely an illustrative example. Other types of information and/or arrangements are possible, depending on the implementation.

Figure 3B:

As described above, a user can input search criteria to search through the paste items. This can be performed, for example, by selecting a link 302 on the report interface 300. As shown in FIG. 3B, in response, the user is presented with a search interface 310. The user can input one or more search criteria into the search interface 310 (e.g., search strings and/or regular expressions). The results of the search can be presented, for example, using the report interface 300.

Figure 3C:
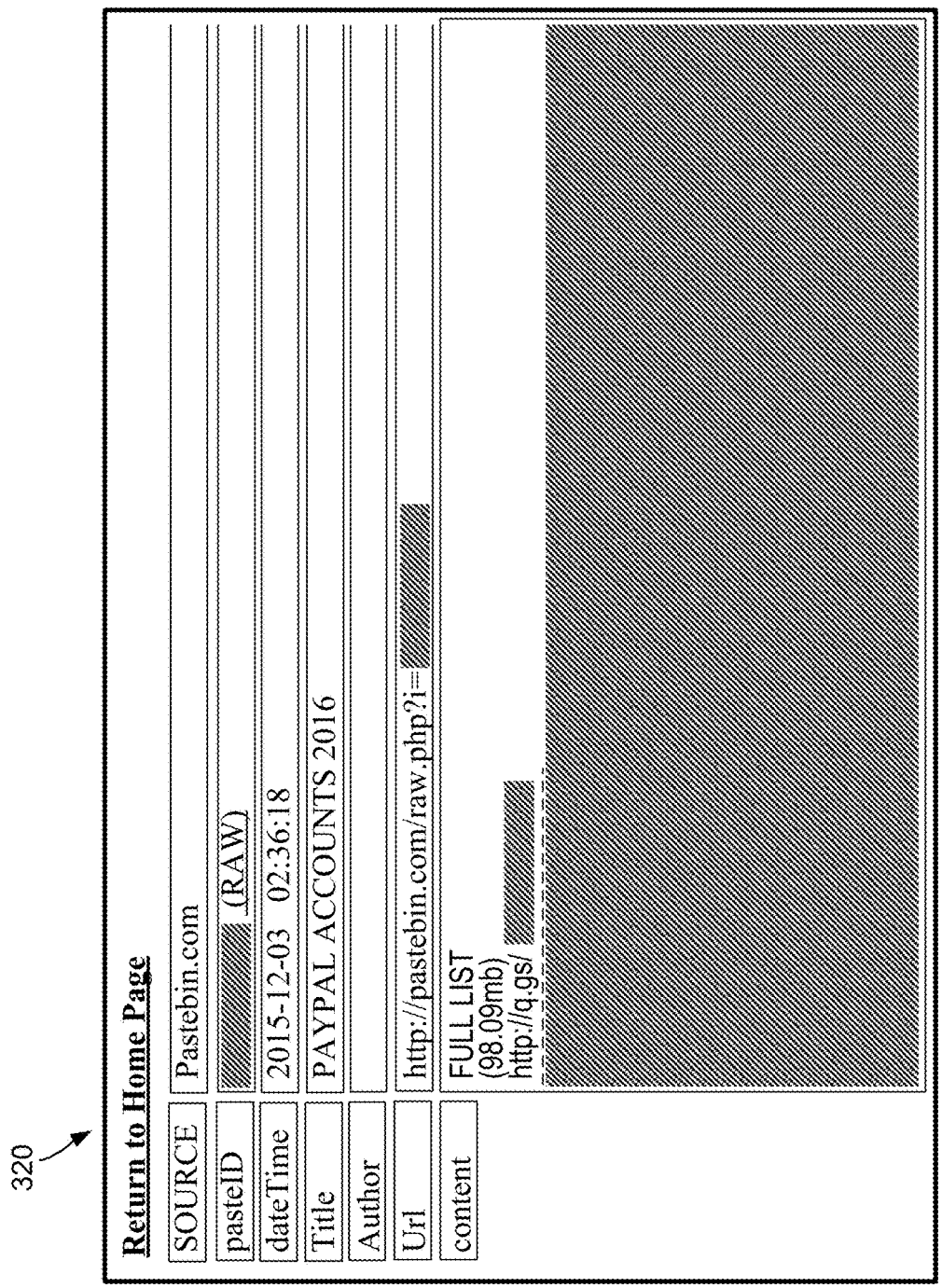

The user can also select a paste item to view additional information regarding that paste item. For example, referring to FIG. 3A, the user can select a link 304 on the report interface 300, corresponding to a paste item 306. As shown in FIG. 3C, in response, the user is presented with a detailed information interface 320, with each row corresponding to different information regarding the paste item 306. In this example, the detailed information interface 320 presents the source of the paste item, an identifier associated with the paste item (e.g., an identification number of character string), the time that the item was published on the paste site, the title of the paste item, the author of the paste site, and the search criteria that match the paste item, an address that can be used to access the paste item (e.g., a URL), and the contents of the paste item. In this example, sensitive information has been obscured. However, in practice, sensitive information can be clearly displayed to the user for examination. Although example types of information and an example arrangement are shown, this is merely an illustrative example. Other types of information and/or arrangements are possible, depending on the implementation.

In some implementations, an enterprise can create and store synthetic data on its computer systems, and use the synthetic data as markers for identifying data theft. For example, the enterprise can create synthetic data having a particular identifiable pattern, and store the synthetic data among the enterprise's sensitive information. The detection system can monitor a publicly accessible network, and determine whether the synthetic data has been published (e.g., by searching for the pattern across one or more paste sites). If the synthetic data is found, the detection system determines that the enterprise's computer system has been compromised (e.g., accessed by an unauthorized individual), and that the sensitive information stored alongside the synthetic data may have been stolen. In response, the enterprise can take appropriate action with respect to the sensitive information (e.g., by notifying potentially affected users, replacing login credentials, opening new or replacement accounts, monitoring account activity for unauthorized activity, and so forth).

In some examples, synthetic data can include data that is not real data, but is representative of real data or mimics real data. For example, the enterprise can create a user account for a non-existent user and can populate the user account with information that appears real, but is fictitious (e.g., fictitious personal information, login credentials, account information, and so forth). The detection system can monitor a publicly accessible network, and determine whether the fictitious information has been published to the network. If the fictitious data is found, the detection system determines that the enterprise's computer system has been compromised, and that the sensitive information stored alongside the fictitious data (e.g., information pertaining to accounts held by real users) may have been stolen. In response, the enterprise can take appropriate action with respect to the sensitive information (e.g., by notifying potentially affected users that their accounts may have been compromised, replacing login credentials for the accounts, opening new or replacement accounts, monitoring the accounts for unauthorized activity, and so forth).

In some examples, the location of the synthetic data within the computer system of the enterprise can be recorded. For example, the synthetic data can be stored in a particular database hosted on a particular server, each of which can be uniquely identified based on respective unique identifiers. In some examples, if the synthetic data is identified as having been posted to a third-party site, the location of the synthetic data within the computer system of the enterprise can be determined to assist in investigating how the synthetic data was accessed.

In some cases, the enterprise can intentionally disseminate synthetic data, and the detection system can monitor a publicly accessible network for publication of the synthetic data. If the synthetic data is found on the network (e.g., posted to a paste site), the detection system determines that other data published alongside the synthetic data (e.g., other information contained within the post) may be stolen data pertaining to the enterprise. In response, the enterprise can take appropriate action (e.g., by notifying potentially affected users that their accounts may have been compromised, replacing login credentials for the accounts, opening new or replacement accounts, monitoring the accounts for unauthorized activity, and so forth). This can be useful, for example, in identifying potential links between published information and the enterprise.

For example, the enterprise can create a user account for a non-existent user and populate the user account with fictitious login credentials. Further, the enterprise can intentionally input the fictitious login credentials into a "phishing" site (e.g., a website that appears to be operated by the enterprise, but is in reality operated by a malicious user attempting to collect login credentials). The detection system monitors a publicly accessible network, and determines whether the fictitious login credentials have been published to the network. If the fictitious login credentials are found (e.g., posted to a paste site), the detection system identifies other login credentials published alongside the fictitious login credentials (e.g., other login credentials published in the post), and determines that those login credentials may relate to real user accounts maintained by the enterprise. In response, the enterprise can take appropriate action (e.g., by notifying potentially affected users that their accounts may have been compromised, replacing login credentials for the accounts, opening new or replacement accounts, monitoring the accounts for unauthorized activity, and so forth).

Although an example system for identifying sensitive data on a single paste site is described herein, this is merely an illustrative example. In some implementations, a system can identify sensitive data on other types of computer systems, either instead or in addition to paste sites. For example, in some cases, a system can identify sensitive data on any number of paste sites, filing sharing sites, online discussion forums, chat rooms (e.g., IRC rooms), wikis, or any other computerized communication medium.

Figure 4:
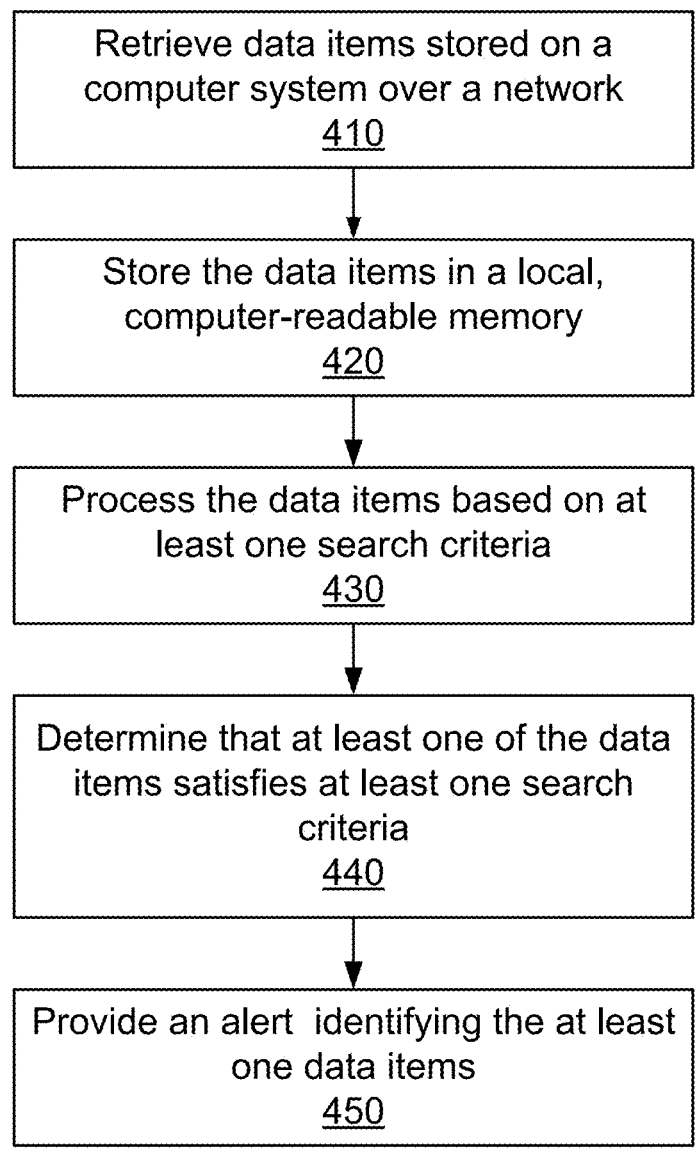
FIG. 4 depicts an example process that can be executed in accordance with implementations of the present disclosure.

FIG. 4 depicts an example process 400 that can be executed in accordance with implementations of the present disclosure. In some implementations, the process 400 can be performed to identify the publication of sensitive data and/or malware to a third-party site. In some examples, the process 400 is provided by one or more computer-executable programs executed by one or more computing devices. In some examples, the process 400 can be provided by the architecture depicted in FIG. 1.

The process 400 begins by retrieving data items stored on a computer system over a network (step 410). The data items can be retrieved, for example, by one or more processors (e.g., one or more processors contained within one or more computing systems, such as those depicted in FIG. 1). As described herein, in some implementations, the computer system can host a third-party site to which the data items are published. For example, the computer system can host a paste site to which paste items are published. As another example, the computer system can host one or more filing sharing sites, online discussion forums, chat rooms, wikis, or any other computerized communication medium.

The retrieved data items are stored in local, computing-readable memory (step 420). These data items can be stored, for example, by one or more processors via one or more storage modules (e.g., the storage module 120 depicted in FIG. 1). As described herein, in some implementations, the data items can be stored locally to a particular computing system, such that it is not readily accessible by the computer system that is hosting the third-party site.

The stored data items are processed based on at least one search criteria (step 430). These data items can be processed, for example, by one or more processors (e.g., one or more processors contained within one or more computing systems, such as those depicted in FIG. 1). As described herein, the search criteria can be used to identify potentially sensitive information contained within the data items. For example, one or more of the search criteria can correspond to personally identifiable information, contact information, login credentials, and/or account information associated with one or more users and/or enterprises. As another example, one or more of the search criteria can correspond to e-mail address, mailing address, telephone numbers, account numbers, and/or passwords associated with one or more users and/or enterprises. The search criteria can be defined in various ways. For example, one or more search criteria can be defined using regular expressions and/or strings of text.

Based on the processing, a determination is made that one or more of the data items satisfies the at least one search criteria (step 440). In response, an alert is provided that identifies the at least one data item (step 450). The determination can be made, for example, by one or more processors (e.g., one or more processors contained within one or more computing systems, such as those depicted in FIG. 1). Similarly, the alert can be provided by the one or more processors.

As described herein, in some implementations, a data item satisfies a search criterion if it matches or otherwise satisfies a particular regular expression or string of text. In some implementations, a data item that satisfies a search criterion contains potentially sensitive information. For example, a data item that satisfies a search criterion might include personally identifiable information, contact information, login credentials, and/or account information associated with one or more users and/or enterprises. As another example, a data item that satisfies a search criterion might include e-mail addresses, mailing address, telephone numbers, account numbers, and/or passwords associated with one or more users and/or enterprises. In some implementations, the search criteria can be used to identify malicious software or computer code.

As described herein, in some implementations, an alert can be provided to inform one or more users regarding the contents of the data items. For example, an alert can be provided to inform a user that sensitive information may have been distributed by a third-party computer system. In some examples, the user can be a user that is affected by the distribution of sensitive data (e.g., a user whose sensitive information was distributed on a paste site or other publically accessible site). In some examples, the alert can be in the form of an e-mail message, a text message, a phone call, a voicemail, a chat message, a fax, or some other message, and transmitted to an appropriate communications device associated with the user. In some examples, the alerts can be sent to one or more customers of a financial institution and/or one or more employees of a financial institution (e.g., a customer service representative, a fraud detection specialist, an administrator, or other employee).

In some implementations, an alert can be provided by cross-referencing the data item against a database containing information regarding one or more users. These databases can include, for example, collections of personally identifiable information, contact information, login credentials, account information, patient information, and/or computer system information regarding each user. The one or more data items can be cross-referenced against the contents of the databases to identify users who may be affected or otherwise associated with information contained within the data items. In turn, those identified users can be notified using the contact information contained within the database.

In some implementations, the computer system can be monitored to determine when new data items are published to the third-party site. In response, the new data item can be retrieved from the computer system, and processed as described herein. In some implementations, the computer system can be monitored to new data items continuously, periodically, or according to some other pattern.

In some implementations, a determination can be made that a data item includes encoded executable data. In response, the encoded executable data can be decoded and analyzed in a sandboxed software testing environment. This can be performed, for example, by one or more processors (e.g., one or more processors contained within one or more computing systems, such as those depicted in FIG. 1).

As described herein, a data item can include executable data that is encoded (e.g., encoded in base64) and presented as plain text. Thus, in some implementations, the executable data can be decoded into an executable file (e.g., an executable binary file) prior to analysis.

In some implementations, the decoded executable data can be analyzed by executing the data in a sandboxed software testing environment, and identifying the effects of the execution. This can include, for example, identifying the deletion or revision of particular data within the sandboxed software testing environment, and/or identifying connection attempts to one or more particular third-party computer systems. As described herein, an alert can be provided to prompt a user to take appropriate action (e.g., analyze the malicious software or computer code to determine its effect and develop countermeasures).

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computing systems 102*a-c* and the modules 110, 120, 130, 140, and 150 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input. In addition, a computer can interact with a user by sending documents to and receiving documents from a device that is used by the user (e.g., by sending web pages to a web browser on a user's client device in response to requests received from the web browser).

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for identifying publication of malicious software or code, the method comprising:
    retrieving, by at least one processor, data items stored on a computer system over a network, the computer system hosting a third-party site, to which the data items are published;
    determining, by the at least one processor, that at least one of the data items comprises executable binary data encoded in plain text, wherein determining that at least one of the data items comprises executable binary data encoded in plain text comprises identifying, in at least one of the data items, one or more patterns of text that are indicative of a header found in encoded executable binary files;
    in response to determining that at least one of the data items comprises executable binary data encoded in plain text, transforming the executable binary data encoded in plain text into an executable binary file; and
    analyzing the executable binary file in a sandboxed software testing environment.

2. The method of claim 1, wherein analyzing the executable binary file in the sandboxed software testing environment comprises executing the executable binary file in the sandboxed software testing environment.

3. The method of claim 1, wherein analyzing the executable binary file in the sandboxed software testing environment further comprises identifying an effect of executing the executable binary file.

4. The method of claim 3, wherein the effect comprises deleting or revising particular data within the sandboxed software testing environment, and/or attempting to contact a particular third-party computer system.

5. The method of claim 3, further comprising providing an alert identifying the effect.

6. The method of claim 1, wherein the executable binary data is encoded in base64.

7. The method of claim 1, wherein the third-party site is a paste site, and wherein the data items are paste items published on the paste site in plain text.

8. The method claim 1, further comprising processing, by the at least one processor, the data items stored in the local, computer-readable memory based on at least one search criteria, wherein one or more of the search criteria corresponds to a string of plain text indicative of malicious software or computer code.

9. The method of claim 1, further comprising monitoring, by the at least one processor, the computing system for newly published data items.

10. The method of claim 9, further comprising determining, by the at least one processor, that a data item has been published by the computing system, and in response, retrieving the published data item.

11. A non-transitory computer-readable medium including one or more sequences of instructions which, when executed by one or more processors, causes:
    retrieving, by the one or more processors, data items stored on a computer system over a network, the computer system hosting a third-party site, to which the data items are published;
    determining, by the one or more processors, that at least one of the data items comprises executable binary data encoded in plain text, wherein determining that at least one of the data items comprises executable binary data encoded in plain text comprises identifying, in at least one of the data items, one or more patterns of text that are indicative of a header found in encoded executable binary files;
    in response to determining that at least one of the data items comprises executable binary data encoded in plain text, transforming the executable binary data encoded in plain text into an executable binary file; and
    analyzing the executable binary file in a sandboxed software testing environment.

12. The non-transitory computer-readable medium of claim 11, wherein analyzing the executable binary file in the sandboxed software testing environment comprises executing the executable binary file in the sandboxed software testing environment.

13. The non-transitory computer-readable medium of claim 11, wherein analyzing the executable binary file in the sandboxed software testing environment further comprises identifying an effect of executing the executable binary file.

14. The non-transitory computer-readable medium of claim 13, wherein the effect comprises deleting or revising particular data within the sandboxed software testing environment, and/or attempting to contact a particular third-party computer system.

15. The non-transitory computer-readable medium of claim 13, wherein the one or more sequences of instructions, when executed by one or more processors, further causes:
    providing an alert identifying the effect.

16. The non-transitory computer-readable medium of claim 11, wherein the executable binary data is encoded in base64.

17. The non-transitory computer-readable medium of claim 11, wherein the third-party site is a paste site, and wherein the data items are paste items published on the paste site in plain text.

18. The non-transitory computer-readable medium of claim 11, wherein the one or more sequences of instructions, when executed by one or more processors, further causes:
    processing, by the one or more processors, the data items stored in the local, computer-readable memory based on at least one search criteria, wherein one or more of the search criteria corresponds to a string of plain text indicative of malicious software or computer code.

19. The non-transitory computer-readable medium of claim 11, wherein the one or more sequences of instructions, when executed by one or more processors, further causes:
    monitoring, by the one or more processors, the computing system for newly published data items.

20. The non-transitory computer-readable medium of claim 19, wherein the one or more sequences of instructions, when executed by one or more processors, further causes:
    determining, by the one or more processors, that a data item has been published by the computing system, and in response, retrieving the published data item.

21. A system comprising:
    one or more processors; and
    a non-transitory computer-readable medium including one or more sequences of instructions which, when executed by the one or more processors, causes:
        retrieving, by the one or more processors, data items stored on a computer system over a network, the computer system hosting a third-party site, to which the data items are published;
        determining, by the one or more processors, that at least one of the data items comprises executable binary data encoded in plain text, wherein determining that at least one of the data items comprises executable binary data encoded in plain text comprises identifying, in at least one of the data items, one or more patterns of text that are indicative of a header found in encoded executable binary files;
        in response to determining that at least one of the data items comprises executable binary data encoded in plain text, transforming the executable binary data encoded in plain text into an executable binary file; and
        analyzing the executable binary file in a sandboxed software testing environment.

22. The system of claim 21, wherein analyzing the executable binary file in the sandboxed software testing environment comprises executing the executable binary file in the sandboxed software testing environment.

23. The system of claim 21, wherein analyzing the executable binary file in the sandboxed software testing environment further comprises identifying an effect of executing the executable binary file.

24. The system of claim 23, wherein the effect comprises deleting or revising particular data within the sandboxed software testing environment, and/or attempting to contact a particular third-party computer system.

25. The system of claim 23, wherein the one or more sequences of instructions, when executed by one or more processors, further causes:
    providing an alert identifying the effect.

26. The system of claim 21, wherein the executable binary data is encoded in base64.

27. The system of claim 21, wherein the third-party site is a paste site, and wherein the data items are paste items published on the paste site in plain text.

28. The system of claim 21, wherein the one or more sequences of instructions, when executed by one or more processors, further causes:
    processing, by the one or more processors, the data items stored in the local, computer-readable memory based on at least one search criteria, wherein one or more of the search criteria corresponds to a string of plain text indicative of malicious software or computer code.

29. The system of claim 21, wherein the one or more sequences of instructions, when executed by one or more processors, further causes:

monitoring, by the one or more processors, the computing system for newly published data items.

30. The system of claim 29, wherein the one or more sequences of instructions, when executed by one or more processors, further causes:
determining, by the one or more processors, that a data item has been published by the computing system, and in response, retrieving the published data item.

\* \* \* \* \*

UNITED STATES PATENT AND TRADEMARK OFFICE
CERTIFICATE OF CORRECTION

PATENT NO. : 10,440,050 B1
APPLICATION NO. : 15/418295
DATED : October 8, 2019
INVENTOR(S) : Robert Jason Neel et al.

Page 1 of 1

It is certified that error appears in the above-identified patent and that said Letters Patent is hereby corrected as shown below:

In the Claims

Column 21, Line 1, Claim 8, delete "method" and insert -- method of --, therefore.

Signed and Sealed this
Fourteenth Day of January, 2020

Andrei Iancu
*Director of the United States Patent and Trademark Office*